United States Patent
Chuprun et al.

(10) Patent No.: US 6,591,084 B1
(45) Date of Patent: Jul. 8, 2003

(54) SATELLITE BASED DATA TRANSFER AND DELIVERY SYSTEM

(75) Inventors: Jeffery Scott Chuprun, Scottsdale, AZ (US); Chad Scott Bergstrom, Chandler, AZ (US); Byron Tarver, Chandler, AZ (US); Bennett Beaudry, Scottsdale, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/066,794

(22) Filed: Apr. 27, 1998

(51) Int. Cl.[7] .................................................. H04B 3/36
(52) U.S. Cl. ...................... 455/3.05; 455/426; 455/517
(58) Field of Search ............................. 455/3.05, 3.06, 455/426, 466, 412, 560, 561, 562, 519

(56) References Cited

U.S. PATENT DOCUMENTS

| | | | |
|---|---|---|---|
| 5,056,107 A | 10/1991 | Johnson et al. | |
| 5,448,230 A | 9/1995 | Schanker et al. | |
| 5,541,589 A | 7/1996 | Delaney | |
| 5,553,094 A | 9/1996 | Johnson et al. | |
| 5,678,172 A | * 10/1997 | Dinkins | ...................... 455/3.05 |
| 6,212,550 B1 | * 4/2001 | Segur | ......................... 455/412 |

* cited by examiner

Primary Examiner—Lester G. Kincaid
(74) Attorney, Agent, or Firm—Jenner & Block, LLC

(57) ABSTRACT

A high speed data transfer system includes a WAU (201) which is utilized to provide high speed data access to satellite transferred data. The system is configured such that a plurality of data utilization devices (205) may access the high speed data via wireless links to the WAU (201). Advantageously, high speed data services may be provided to users without the users requiring individual satellite antennas.

23 Claims, 7 Drawing Sheets

SATELLITE BASED DATA TRANSFER AND DELIVERY SYSTEM

STATEMENT OF GOVERNMENT RIGHTS

This invention was made with government support under Contract No. DAAL01-96-2-0002 awarded by the Army Research Laboratory. The Government has certain rights in this invention.

FIELD OF THE INVENTION

This invention relates to bi-directional communication systems and methods, and in particular, to an integrated satellite based data communication system.

BACKGROUND OF THE INVENTION

Business, retail, medical, university, transportation center and residential customers have a need for high data rate media transfer systems that link or interface to data utilization devices, such as personal computers (PCs) and workstations. As used herein, PCs will be understood to include personal computers, workstations and other similar data acquisition and/or origination terminals. A need exists for providing low cost wireless and wired high data rate/low delay information exchange to customer data utilization devices. Currently, no wireless high data rate bi-directional service exists between consumers, satellites, and wireline services. One problem with existing terrestrial systems is that the data transfer rate is relatively slow or alternatively is expensive. With current methods, data transfer is typically slow, resulting in long data-download times. Furthermore, real-time, high fidelity audio/video is often impractical given the current state-of-the-art. To provide high data rate capability to all potential users requires a high cost in capital equipment and assets or fixed-site operation to provide a system with widespread accessibility. So called "wireless" systems can provide significant high data rate transfers and widespread accessibility. However, no system presently exists incorporating inexpensive wireless transfer of satellite, terrestrial backbones, cellular data services, and wireline data which will provide economic access to such wireless and wired data sources. It is also desirable to provide for accessing information by wireless methods thereby providing freedom of movement for users and elimination of the cost of wired infrastructure.

Satellite based systems are under construction or are proposed which will make high data rate/low delay information transfer widely available. However, as presently planned or proposed such satellite systems require an expensive satellite transceiver and directional antenna at each user. What is needed are low cost software configurable satellite interfaces that leverage existing consumer equipment (e.g., laptop, palmtop, and desktop computers). For instance, at least one proposed system requires that each business and each residence have a stationary direct satellite link for the exchange of high speed data including multimedia data. In addition, there are many terrestrial data sources or sites with which it is desirable to have high speed data access. Such sites vary in the number of data consumers over the course of time. Hence, data demand can vary as customers enter or leave service areas. Therefore, it is further desirable to provide a system which will permit mobile access to high speed data sources and not have high associated costs as are required for existing data transfer systems and apparatus. It is also desirable that these data services provide self forming network services, depending upon spatial proximity of mobile users and data and bandwidth demands of stationary customers. Further, data information sources each use specific protocols for data routing transfer, packetizing, and switching. Therefore, there is a further need for a wireless interface to multiple data sources that provides a seamless, transparent interface between user and data service.

BRIEF DESCRIPTION OF THE DRAWING

The invention will be better understood from a reading of the following detailed description in conjunction with the drawing figures in which like reference designators are use to identify like elements, and in which.

DETAILED DESCRIPTION

Figure 1:
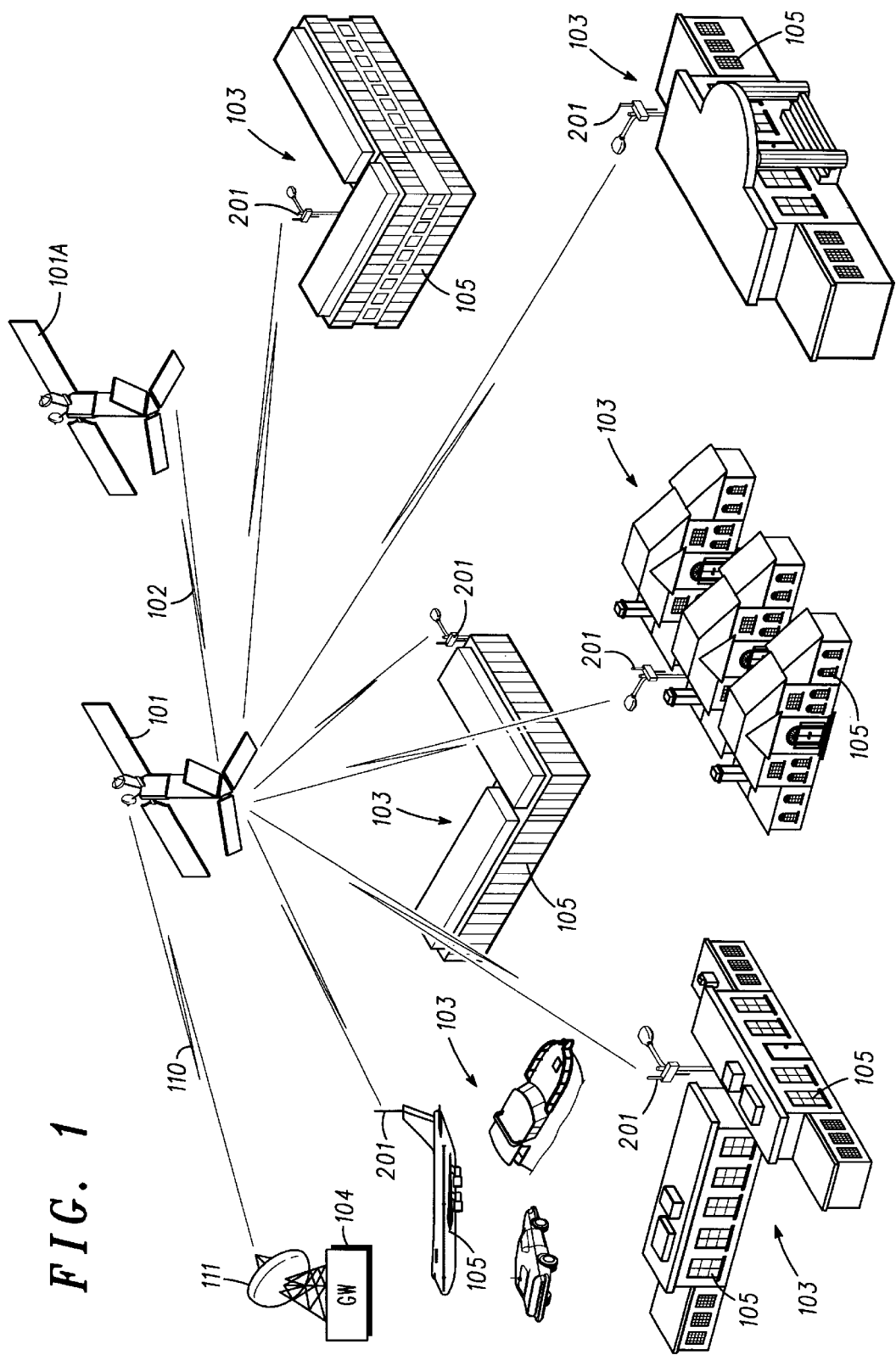
FIG. 1 is an overall system diagram of a system in accordance with the principles of the invention.

In accordance with the principles of the invention, a system is provided in which high data rate, low delay wireless data communication is provided to pluralities of users. Each plurality of users is served from a single, central wireless access unit (WAU). The WAU, in accordance with the invention, provides centralized wireless access for a plurality of users to satellite data communications and in addition, provides access to other high data rate services which may be wireless or wired. The invention advantageously provides for wireless communication between each data utilization device or PC and the WAU thereby permitting users to access the high data rate, low delay data from substantially any location within the range of the WAU. Thus, a system in accordance with the invention provides that a plurality of users may access satellite transferred data and wired data services, via one or more WAU devices, thereby allowing wireless bi-directional interchange of data. In a system in accordance with the invention, a plurality of users of high data rate, low delay wireless data access a proximity WAU which in turn accesses a satellite link or another WAU, or one or more of a number of wired and wireless services available within proximity of the WAU. In addition to independent access to one or more WAU devices, each user may also transfer data in a distributed peer-to-peer fashion.

In accordance with the principles of the invention, a Wireless Information Technology System (WITS) is provided which interfaces to multiple information sources and extends these services via wireless links, to users while providing self-forming network adaptability, frequency adaptability, modulation adaptability, interference suppression adaptability, overlay adaptability, and bandwidth adaptability. The system performs a seamless protocol transformation of subscriber data, providing a near transparent interface between consumer and desired information sources. A system in accordance with the principles of the invention provides for high data rate wireless information exchange to a plurality of users from a satellite antenna and associated satellite communication system, other terrestrial wireless systems or wired bi-directional data systems and sources. As used herein, the term "high data rate" is typically used to refer to data rates exceeding, for example, 400 kilobits per second (kbps).

In accordance with a further aspect of the invention, the WAU provides the ability to access information by wireless methods, thereby providing freedom of movement for users and elimination of the cost of a wired infrastructure between each user and the data communication services. By permitting wireless access between each PC and the WAU, a plurality of users located within wireless range of the WAU can access the high speed satellite, terrestrial microwave and cellular data services via the WAU. Access to multiple information sources and extension of these services via wireless links to the PC users is possible with the system in accordance with the invention. Each WAU and its associated users forms a cell within which users have wireless access to data services via the WAU. Since users can be mobile, one embodiment of the invention includes self-forming network adaptability whereby mobile nodes are "affiliated" with a nearby WAU automatically. As users move into other WAU cells, the cells perform handoff and affiliation functions for seamless data access. Advantageously, a single WITS WAU satellite transceiver microwave and cellular data subsystem or interface can service multiple users whether the users are mobile or stationary. In addition, wired services may be provided to those same users without the expense or difficulty of providing a wired connection to each user.

Turning now to FIG. 1, a system in accordance with the invention is shown. The system includes one or more satellites 101 which are part of a constellation of satellites. The constellation may be any one of several satellite constellations, such as a constellation of low earth orbit (LEO) satellites or of high earth orbit (HEO) satellites, which includes middle earth orbit (MEO) and geosynchronous earth orbit (GEO) satellites, or a constellation comprising both LEO and HEO satellites such as in the Celestri™ system developed by the assignee of the present invention. Satellite, or platform, 101 may have an intersatellite link (ISL), or interplatform link, 102 to one or more additional satellites 101a which forms part of a satellite constellation. Satellite 101 also has satellite links 110 to a ground antenna 111 which is coupled to optional gateway 104. Gateway 104 may be a satellite gateway of a type well known to those skilled in the art to provide access to various information sources, such as IP or PSTN/ISDN, for example.

Satellite 101 may be accessed by a plurality of cells 103 that performs seamless protocol transformation and multiport distribution to a plurality of users 105. Although only six cells 103 are shown, it should be appreciated that a larger or smaller number of terrestrial cells may be accessible by the satellite constellation. What is needed are cell-specific applications, whereby each cell will have a different type of data service tailored to the user requirements of each cell population. For example, medical campus requirements will use the invention for data transfer services that include: patient records, outpatient data, X-rays, CAT scans, MRI scans, provider consult data, insurance data links, transcription data, telemedicine services, billing, medical order transfer, medical research, and real time audiovisual medivac data. University campus services can use the invention for: records maintenance (e.g., transcripts, billing, etc.), library access, internet access, virtual professorships, research, remote audiovisual class attendance, inter campus housing, and inter university LANs. Neighborhood applications for the invention include: DSS delivery, movies on demand, internet access, telephony services, video telephone services, high-definition television (HDTV) services, real time on-demand CD audio, home shopping, home banking, profile based information delivery, and remote home environment management. Industrial campus applications of the invention include: wireless LANs, shop assembly and parts coordination, paging services, inventory control and RF tag services, telecommuting services, and remote sensor applications for electric, oil, gas, water, and other similar utilities. Commercial and retail campus services provided by the invention include: billing services, real time inventory control, real time shopping services, advertisement applications, real time delivery tracking, audiovisual customer service, reservation services, staff management and tracking, and security applications. Mobile applications of the invention include: vehicle tracking, real time location information, real time map delivery, and high speed passenger internet access.

For any data service provided by the invention, custom software will be provided to an individual user via disks 210 or directly over the high speed wireless link, once subscription confirmation has been received. This software will provide user access to the type of data desired. Hence, data utilization device 205 is understood to be a general purpose, software configurable appliance which is uniquely and dynamically tailored to user data requirements and cell populations. Each cell 103 has a WAU 201 and a corresponding group of users 105. Accordingly, each of the users 105 are able to communicate with satellite 101, or other high data rate services that are processed through gateway 104, by transferring data to and from WAU 201. This avoids the need for each user 105 to communicate directly with satellite 101, which would require a separate high cost transceiver and associated satellite antenna with proper placement for satellite visibility.

Figure 2:
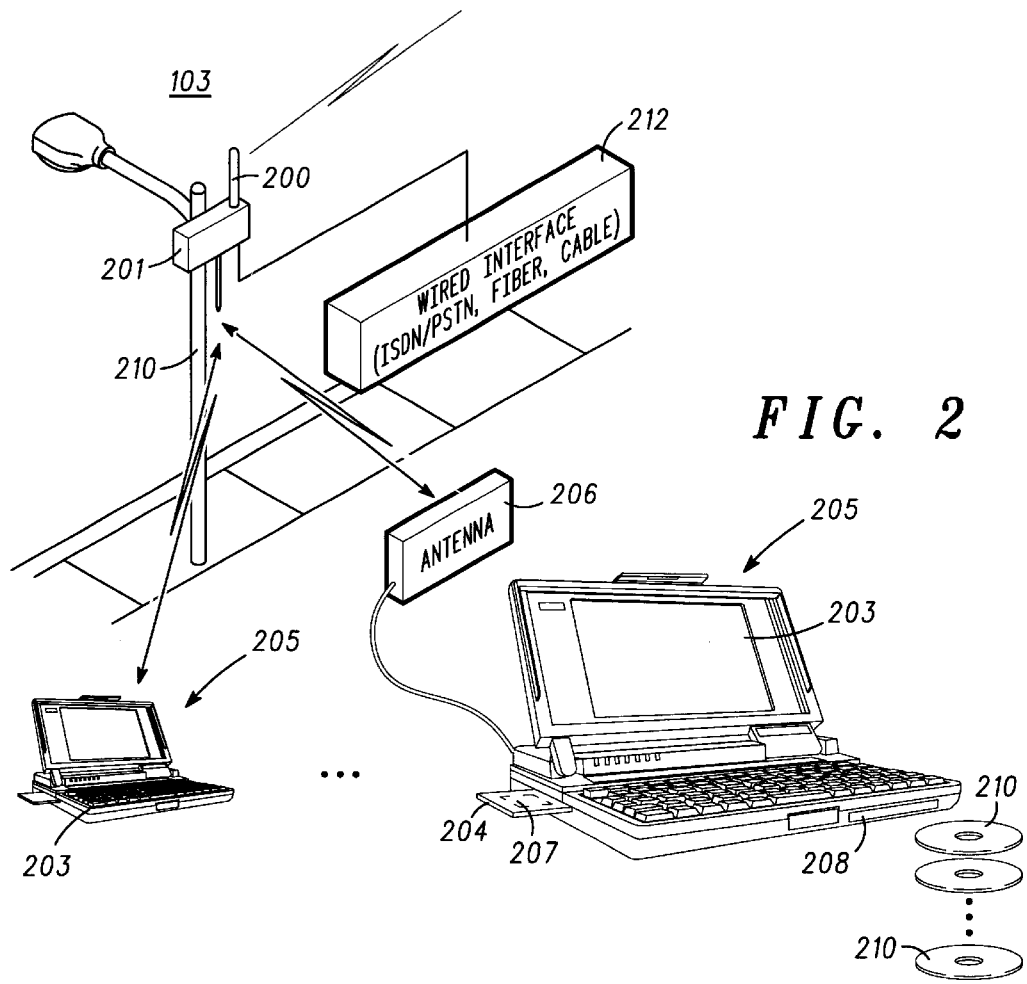
FIG. 2 illustrates a portion of the system of FIG. 1 in greater detail.

Turning now to FIG. 2, a portion of one of the cells 103 is shown in greater detail. Each cell 103 includes a satellite antenna 200 coupled to a WITS WAU 201. The WITS WAU 201 typically includes a transceiver for transferring information between WAU 201 and the users associated with the cell 103, as will be described in more detail when discussing FIG. 3. WITS WAU 201 is preferably located at a high point in the cell region, such as on top of a utility pole, an antenna tower, or on top of a building. In general, it is desirable to mount the WAU 201 to a preexisting structure within the 103 to reduce WITS implementation costs. In one embodiment of the invention, the WAU 201 is implemented in a relatively compact, lightweight package that can be easily mounted by a single installer. The package can include, for example, a clamp for fastening the WAU 201 to a pole or other structure. In addition to providing ease of installation, the compact, lightweight package also facilitates maintenance of the WAU 201. That is, the WAU 201 may be easily removed for periodic servicing and/or replacement.

The position of WAU 201 within the cell 103 is a factor in determining the area or range of operation in which users may access WAU 201. In general, the higher the WAU 201 is mounted within the cell, the greater the possible range of coverage. In one approach, relatively small cells having relatively few users per cell are used. Using this approach, the WAU 201 can be mounted lower in the cell 103, such as on the top of a street light post 210. In the preferred embodiment, the nominal range of each WAU 201 will be in excess of one mile.

High density dwelling conditions, such as in high rise office and apartment buildings, typically prevent use of satellite tracking antennas by each resident. The use of a WITS WAU 201 in accordance with the invention addresses this limitation by allowing users to access data from satellites via the WITS WAU 201 which is located in a position for tracking and communicating with the satellites. The satellite access antenna may be of dish type, or, for more flexible satellite access, a phased array antenna.

Each user in the cell 103 typically has a data utilization device 205 which, for example, can take the form of a personal computer (PC) 203. WITS WAU 201 provides wireless access and distribution of high speed data services from satellites, for example, to a plurality of data utilization devices 205, typically including PC units 203 in a high density complex, and eliminates the need for wiring each building unit with satellite antenna capability. In a preferred embodiment, WITS WAU 201 will also incorporate an omnidirectional antenna for data transfer to/from user terminals, although other antenna configurations may also be appropriate.

Each PC 203 is a platform that accepts software files designed to program and interact with a subscriber interface module (SIM) 204. SIM 204 may take the form of, or be included within, a PCMCIA type card. In an alternate embodiment, SIM 204 may be a separate portable device that connects using a PCMCIA bus slot of PC 203. SIM 204 includes a transceiver 207 to provide the wireless connection to WITS WAU 201 for data services. SIM 204 includes (or can be connected to) an antenna 206 of conventional design for the frequency band of interest and desired polarization (e.g., circular polarization) or sectored antennas. Transceiver 207 performs all modulation and demodulation functions for transmit and receive communications to the WITS WAU 201. In this regard, SIM 204 can, in one embodiment, receive commands and/or configuration data from the PC 203 for use in processing any of a number of different waveforms.

In the illustrated embodiment of the invention, data transfers between the WITS WAU 201 and transceiver 207 provide minimum interference to existing terrestrial voice and data services by utilizing spread spectrum transmission and/or by utilizing portions of the spectrum that are not currently occupied. Accordingly, in a preferred embodiment, transceiver 207 is a spread spectrum transceiver or high data rate transceiver, both with multiple access capability.

PC 203 may also include drive 208 for receiving one or more disks 210 having specific wireless application software stored thereon. This allows the PC 203 to be upgraded to higher capacity and more bandwidth efficient waveforms. In addition to link-specific software, drive 208 and disks 210 also provide functionality specific to the type of data service being utilized by the consumer.

Figure 3:
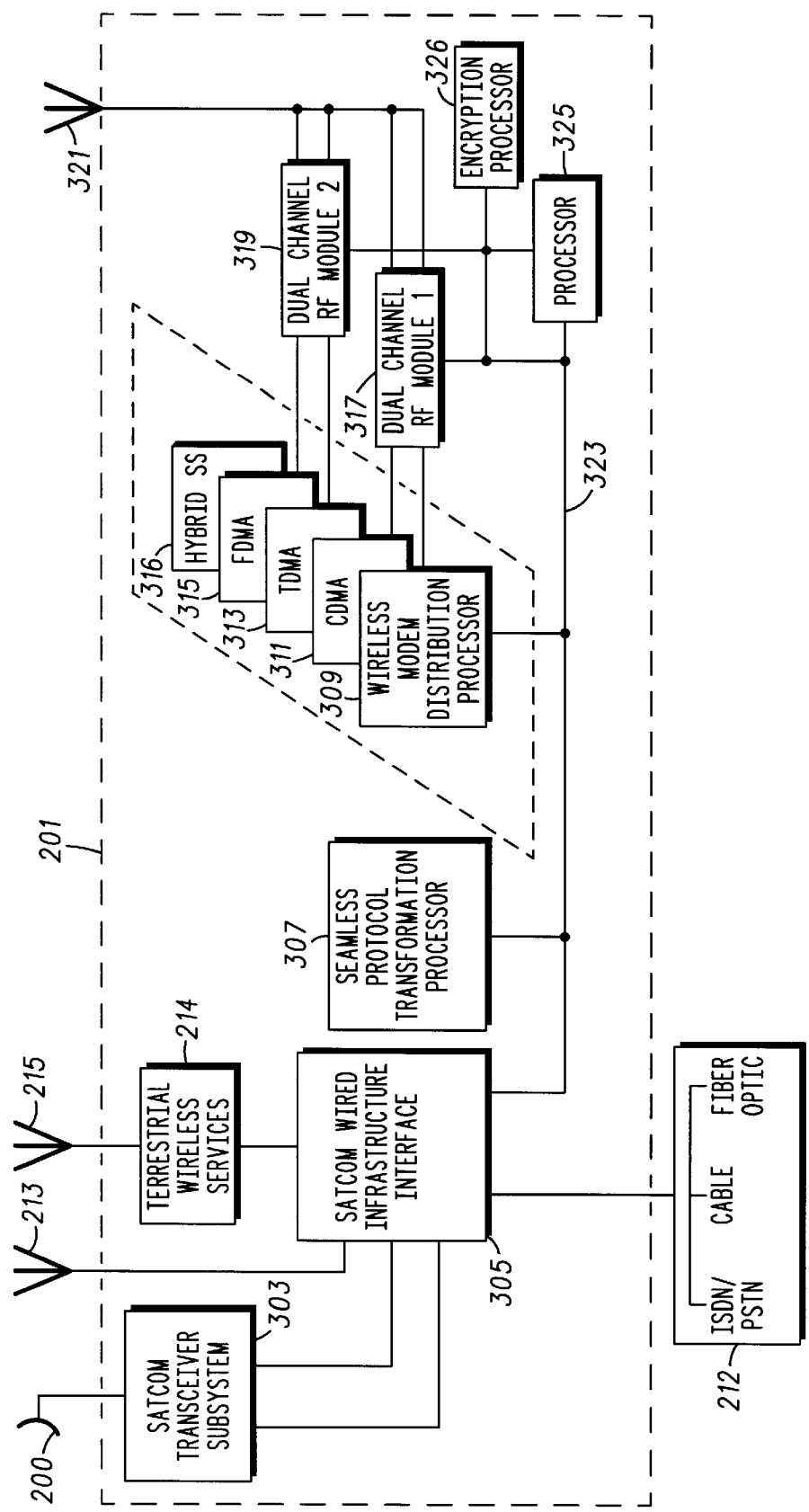
FIG. 3 is a block diagram of a subsystem utilized in the system portion of FIG. 2.

Turning now to FIG. 3, WITS WAU 201 is shown in block diagram form. WITS WAU 201 includes a satellite antenna 200 coupled to a satellite communication (satcom) transceiver subsystem 303. Satellite antenna 200 may be a dish type, or, for more flexible satellite access, a phased array antenna. Satcom transceiver subsystem 303 is coupled to a satcom wired infrastructure interface 305. Satcom wired infrastructure interface 305 can be coupled to various wired data services available in the vicinity of WITS WAU 201 and which are collectively identified as wired services 212. Wired services 212 may also be accessed via wireless WAU link 213, which communicates with other WAU devices in a peer-to-peer fashion. In this manner, only select WAU devices require wired connections to wired services 212. Wireless WAU link 213 may be a separate antenna, or, alternatively may be included in the functionality of satellite antenna 200. As noted above, wired services include, but are not limited to, ISDN, cable and fiber optic accessible services. Satcom wired infrastructure interface 305 can also be coupled to various terrestrial wireless services 214. These services can include, but are not limited to, terrestrial microwave links, cellular, and land mobile radio services.

A seamless protocol transformation processor 307 is utilized to provide for protocol transformations between data protocols from: (i) satcom transceiver subsystem 303, (ii) wired services 212, (iii) terrestrial wireless services, (iv) terrestrial microwave services, and (v) cellular/land mobile services and the data protocols used to link to user PCs 203 with wireless signals.

A wireless modem distribution processor (WDP) 309 is coupled between protocol transformation processor 307 and RF modules 317 and 319 which are in turn coupled to antenna 321. A processor 325 is coupled via bus 323 to satcom wired infrastructure interface 305, seamless protocol transformation processor 307, wireless modem distribution processor 309, and RF modules 317 and 319. Processor 325 includes associated memory which is not shown, but which is familiar to those skilled in the art. As will also be understood by those skilled in the art, although the block diagram of FIG. 3 illustrates various blocks, the individual blocks may be implemented in either hardware or software and the bus structure 323, as well as the various connections between blocks, are intended to indicate functional interconnection rather than to indicate actual physical connections. The various processors indicated in the drawing of WITS WAU 201 may be implemented in one or more actual processors. Processor 325, as well as the other processors indicated in the FIG. 3, if separately implemented, may be a commercially available processor, such as microprocessors available from Motorola, Inc., the assignee of the present invention. This host processor and bus structure is capable of sending status messages describing WAU utilization, node command, spectral conflicts, special requests, and relative software uploads, failures, need for network restart, and power loss. WITS WAU 201 also included encryption processor 326 which provides wireless transfer security.

Satellite antenna 200 is used to establish and maintain the link to a satellite 101. Antenna 200 is coupled in conventional fashion to the satcom transceiver subsystem 303. Satcom transceiver 303 is of conventional design and provides a high data rate bi-directional link to satellite constellation 101 via antenna 200.

WITS WAU 201 is interfaced with wired services 212 via satcom wired infrastructure interface 305 and wireless WAU link 213. Processor 325 includes selection capability to select a data route via satellite, terrestrial microwave, cellular data, WAU peer-to-peer, or the various wired services 212 based on cost, information content, and delay profiles selected and transferred to the WITS WAU 201 by means of automatic user node affiliation, and maintained in WITS WAU memory. Alternatively, software in the WITS WAU 201 can automatically select one service from multiple choices based upon predetermined parameters or algorithms. The software can also provide adaptive functionality for waveforms transmitted via antenna 321 and wireless WAU link 213 including, but not limited to, frequency, modulation and bandwidth.

Figure 9:
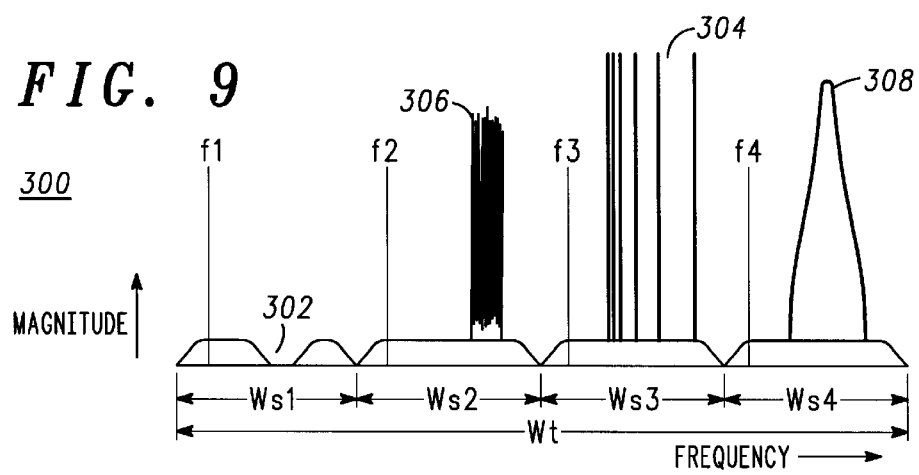
FIG. 9 is a spectrum diagram illustrating a possible spectrum for a system implementing a frequency hopping/direct sequence spread spectrum approach in accordance with one embodiment of the present invention.

WITS WAU 201 supports software configurable modem technology that provides a family of wireless signals such as DSPN/CDMA, QAM/TDMA, PSK/OFDM, FH/CDMA, and other wireless multiple access techniques that are compatible with the local data utilization devices. Further, various wireless interfaces may be provided through the use of programmable modem modules 311, 313, 315, and 316. Modem modules 311–315 are typical examples of how WDP 309 may be programmed (i.e., to support, for example, code division multiple access (CDMA), time division multiple access (TDMA), and frequency division multiple access (FDMA)). It should be understood that other wireless multiple access schemes are also possible as needed. In a preferred embodiment, hybrid spread spectrum modulation is used via hybrid SS module 316. In this preferred embodiment, hybrid modulation includes both frequency hop (FH) and direct sequence (DS) methods in order to minimize WITS service impact on existing wireless services, while simultaneously reducing the interference impact of these existing services on the WITS-delivered data. FIG. 9 illustrates an example FH/DS hybrid spectrum 300, including typical interference sources, such as fading 302, pilot tone interference 304, noise interference 306, and bauded co-channel interference 308. Each hop frequency fn is spread over a corresponding channel consisting of bandwidth WsN, for a total spreading bandwidth of Wt. Although four hopping bands are shown in the FIG. 9, the actual number of hopping frequencies will vary depending upon the environment and spectrum availability. When operating near or below the ambient noise floor, spreading the hop impulse in this manner results in a spectral distribution that minimizes the WITS interference impact on existing wireless services, while allowing for the application of interference suppression algorithms at data utilization device 205. Since spreading serves to improve interference immunity, reduced hop bandwidths may be implemented to lower hop rates which are less than the current state-of-the-art. These lower hop rates and bandwidths will enable simplified transceiver implementations. Note that when the DS processing gain is low, the FH/DS hybrid will approach the pure FH system. Hence, in one embodiment, the invention further includes the ability to adjust the hop bandwidths and spreading sequences depending on the contiguous spectrum availability and existing service density and sensitivity requirements. Furthermore, since DSPN is applied primarily for the purposes of impulse concealment and interference rejection functionality, power control issues are less problematic. Hence, a small number of spreading sequences may be used primarily to prevent the damaging effects of hop collisions between sub-nets (e.g., adjacent WITS cells).

Figure 10:
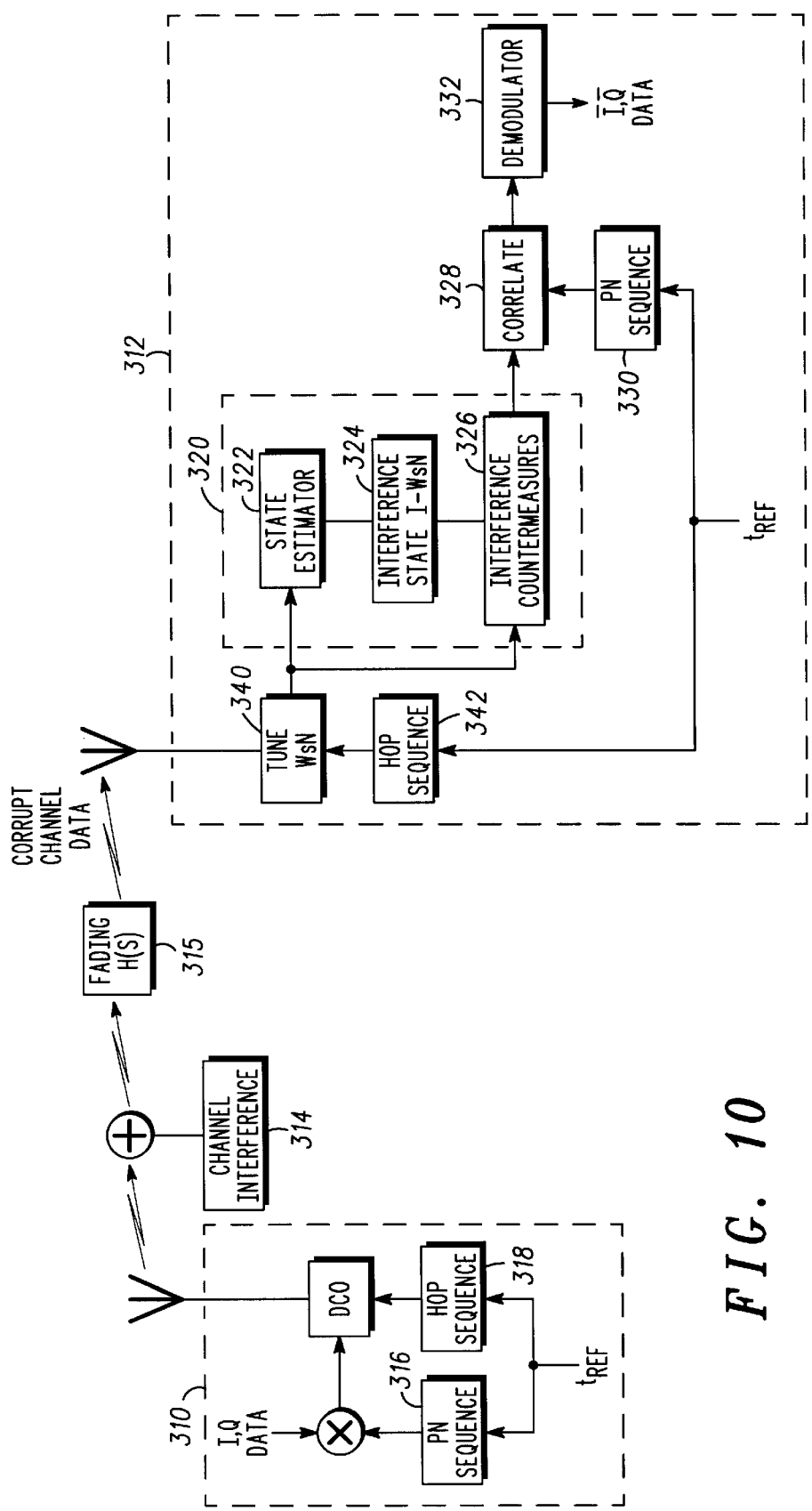
FIG. 10 is a block diagram illustrating a communications system utilizing a frequency hopping/direct sequence spread spectrum approach in accordance with one embodiment of the present invention.

FIG. 10 illustrates one embodiment of the FH/DS approach showing a transmitter 310, a receiver 312, and corresponding channel interference sources 314, 315. The figure shows in-phase (I) and quadrature (Q) data being spread by a pseudo-noise (PN) spreading sequence 316 and shifted via a hop sequence 318 and direct digital synthesizer (DDS) prior to channel transmission. Any modulation source may be used, for example, a QPSK source may be implemented for the I,Q data stream with a sufficient DS processing gain, for example, 24–33 dB. Note from the figure that the channel interference sources include a fading component, H(s). Frequency selective fades may be mitigated via adaptive signal processing. For wideband interference sources and shadowing fades, channel coding can provide sufficient gain to close the link, albeit at a reduction in data throughput. Referring again to FIG. 10, note that the receiver 312 tunes each WsN 340 corresponding to the hop sequence 342, with timing given by $t_{ref}$ supplied by, for example, stable oscillators or GPS data. The corrupted data is then passed to an adaptation processor 320, which may be located on either SIM 204 or data utilization device 205. In the preferred embodiment of the invention, the adaptation processor 320 which performs periodic state estimation 322, stores the state information to interference state memory 324, and, in parallel, performs interference countermeasures 326 corresponding to the prior interference state. Following the adaptation processor 320, the restored data is correlated 328 against the appropriate PN sequence 330 for despreading, and demodulated 332, producing estimates of the I and Q data streams. WITS WAU 201 also includes one or more common software based WDPs 309 that supply programmable data rates and waveform modes appropriate to communicate with data utilization devices 205.

Satcom transceiver subsystem (STS) 303 has the capability to acquire, track, demodulate, and maintain contact to LEO and HEO satellites, and/or other platforms, which may include Geosynchronous Earth Orbiting (GEO) satellite up/downlinks. STS 303 is of conventional design. Interface 305 comprises conventional interfaces to STS 303, terrestrial microwave and cellular data services, and to the ISDN, cable and fiber networks. By providing connection to these services at WITS WAU 201, the data services provided by these various high data rate services are provided to all users of the WITS WAU 201 without the necessity of providing connections directly from each satellite antenna or terrestrial wireless systems to each individual user.

WITS WAU 201 may operate with a variety of service dependent protocols. Accordingly, to facilitate the flexibility of operating with the various protocols, WITS WAU 201 includes a seamless protocol transformation (SPT) processor 307 for providing a seamless protocol transformation such that whatever signal protocol is received from the sources coupled to interface 305 is transformed to the proper data link layer format for wireless transmission to the users 105 of WAU 201. SPT processor 307 receives a satcom, microwave, cellular, or wired signal from the appropriate transceiver interfaces 305 and 307 and transforms it up the open signaling interface (OSI) protocol stack layer to provide a multiple access system that allows connectivity to many users. SPT processor 307 performs bi-directional physical and upper layer mapping and transformations to provide compatibility with the final stage media transmission with appropriate mobile identification. The functionality of SPT processor 307 includes ATM (asynchronous transfer mode)-to-wireless, ISDN-to-wireless, Cable-to-wireless, fiber optic-to-wireless, terrestrial wireless-to-wireless, and other protocol transformations. SPT processor 307 provides transformation between the WDP 309 and interface 305.

WDP 309 is a software configurable modem for providing a family of wireless signals, such as frequency hop (FH)/CDMA, DSPN/CDMA 311, QAM/TDMA 313, PSK/OFDM 315 and other multiple access techniques. The various signals are utilized to provide modulation signals information to a transceiver comprising RF modules 317, 319 which are operable in various modulation arrangements, such as PSK-OFDM, SSPN, SSFH, and other high data rate modes. Spread spectrum techniques allow operation in areas of the spectrum that are already occupied by other systems, without interfering with the other systems. Modulation formats are software selectable within WITS WAU 201 and are remotely programmable as well as field programmable.

Figure 4:
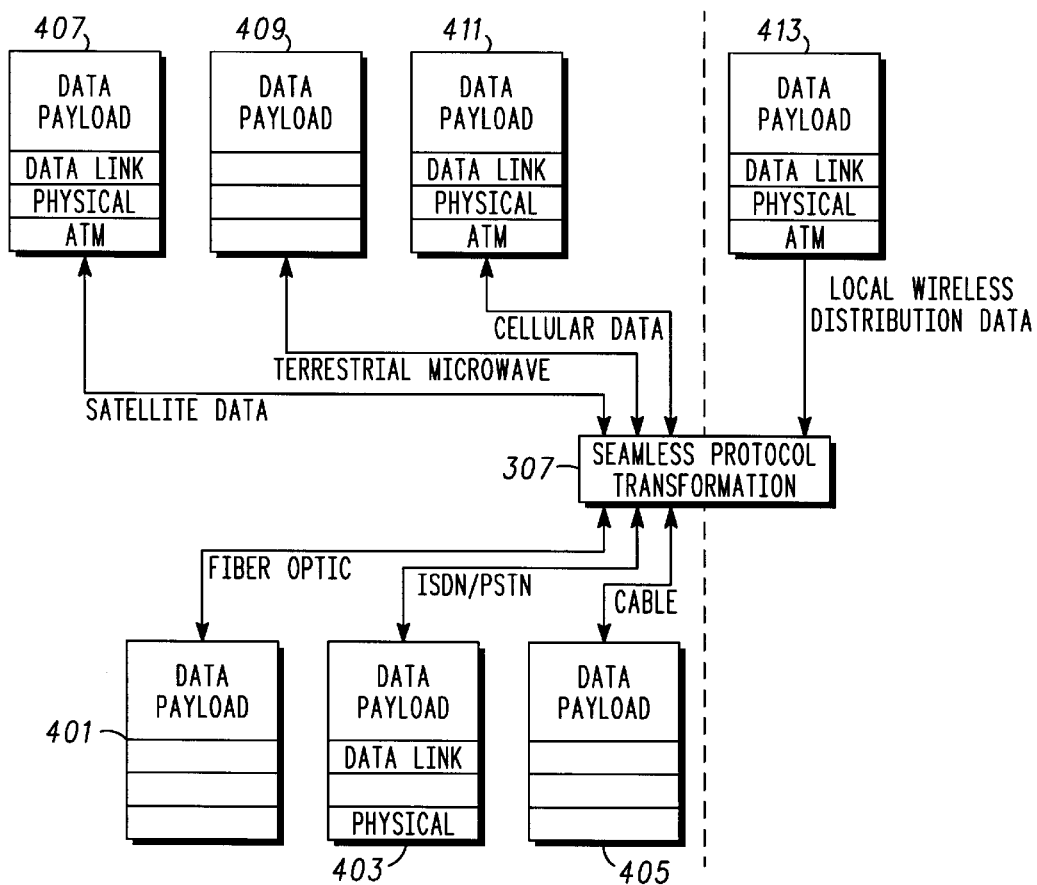
FIG. 4 illustrates different payload data which are utilized in the system of FIG. 1.

FIG. 4 illustrates the operation of the SPT processor 307 with respect to a plurality of different payload data, whereby each data payload has certain attributes associated therewith. For example, data payload 401 includes data that is characteristic of fiber optic data. SPT processor 307 provides the transformation from the specific protocols associated with wired protocols 401, 403, 405, satcom payload 407, terrestrial microwave protocol 409, cellular protocol 411, and wireless distribution protocol 413 to RF modules 317 and 319. Subsequently, the information is transferred to and from cell users 105.

WITS WAU 201 provides high data rate satellite signals and information to its local area with minimum interference to existing terrestrial voice and data services. WDP 309 and RF modules 317 and 319 facilitate spread spectrum signals, including for example, frequency hopped signals, direct sequence signals, or hybrid signals, whereby spread spectrum signal technology is utilized to allow existing narrowband signals for cellular and land mobile radio (LMR) traffic, among others, to occupy the same frequency bands without impact on these services. Spread spectrum signals support multiple access schemes to increase user density on each channel and improve spectrum reuse. Spread spectrum signals are especially effective in overcoming frequency selective fading, common to urban mobile environments. A high data rate capability facilitates transfer of video and other large files with low delay to the end user.

Figure 5:
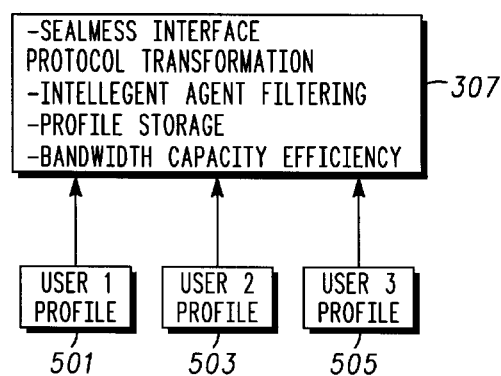
FIG. 5 is a system block diagram illustrating the access of a number of subscribers to the subsystem of FIG. 3.

Turning now to FIG. 5, the profiling capability of the WITS WAU 201 is illustrated. Processor 325 of FIG. 3 provides for storing, in memory, various user specific profiles 501–505 for each user PC 203 (of FIG. 2) whereby PC 203 forwards this information to WITS WAU 201. For each user registered with WITS WAU 201 a specific user profile is established, whereby representative user profiles 501, 503 and 505 are shown in FIG. 5. Each user profile may, for example, indicate the users wireless interface capability to the WITS WAU (e.g., bandwidth allocation). Further, each user profile may be used to identify the service to which the user subscribes as well as providing cost limits on what the user is willing to pay for service. Also, the user profile may include limits of the hardware and limits on the data rates. Profile information can include specifying information types, time of day or date-based delivery, and the type of data services that the user would like to receive. Profiles may also specify time delay limits on delivery. Profile information can also identify specified types of data such as advertising which the user would like to reject as well as preferred data sources for scanning user-provided keywords. When a user initiates contact to WITS WAU 201, profile information is provided in a wireless segment or packet and received by WITS WAU 201. Processor 325 of FIG. 3 forwards profile information to SPT 307 which stores profile information and operates as an intelligent agent. SPT 307 then is operable to filter the data to and from each of the users.

Figure 6:
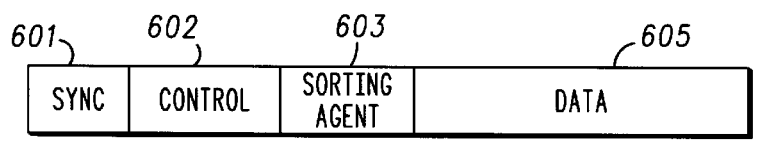
FIG. 6 illustrates a data frame structure utilized in the system of FIG. 1.

FIG. 6 illustrates a frame format for a typical signal that comes in to WITS WAU 201 from one of the plurality of data payloads 401–413. The format is illustrated for a wire to wireless signal, such as cable. That signal enters the WITS WAU 201 via wire line. The signal has a frame structure or protocol that includes synchronization bits 601, control bits 602, sorting agent bits 603, and data bits 605. Synchronization bits 601 are utilized to provide coherence between WAU 201 and the payloads. Control bits 602 are utilized to set various control parameters between WAU 201 and the payloads, such as: 1) multiple access modulation type/rate, 2) message source/destination, 3) message type-length, 4) error coding type, 5) power level, 6) source destination routing tree, 7) time priority and 8) data loss. Sorting agent bits, or sorting fields, 603 are utilized for determining whether data is for a particular user based on its user profile and the type of information that the user desires to receive. Finally, data bits, or data field, 605 includes the data to be transferred. SPT 307 utilizes intelligent agent information segment 602 and decides whether this information is valid and should be forwarded on. If it is not valid, SPT 307 does not load that application for retransmittal. If SPT 307 determines that the data is valid for a particular user, that data is then decoded, error corrected, and reformatted into the appropriate wireless access protocol for the specified user.

In operation, WITS WAU 201 is capable of automatic spectral awareness and management for the frequency channels used in the wireless distribution of information to each user. Processor 325 operates in cooperation with RF modules 317 and 319 to search for the unoccupied spectrum when operating in areas that will not allow fixed or preassigned operating bands and channels. The designated operating bands are scanned and spectral activity estimates of this possible channel space are developed. Decision criteria are applied by processor 325 to select the proper operating center frequencies and to periodically assess and reallocate to new bands as the background wireless systems dictate.

The unique spectral awareness capabilities of the WITS WAU 201 allow selection of the operating bands within the coverage of the SIM 204. This reduces interference on the existing wireless systems not related to WITS WAU 201. Dynamic spectrum awareness knowledge of transmission activity occurring simultaneously on other channels is used to prevent interference.

The above-described capabilities facilitate automatic spectrum planning and co-site contention resolution during system setup and service initiation. In this scenario, throughput preservation and system overlay capability is at odds with fixed-frequency paradigms. Growing spectral clutter is evidenced by increasing commercial services, such as PCS, AMPS-IS136, IS-95, GSM, DSS, Iridium, Celestri, and Teledesic. Historically, spectrum utilization has tended toward the lower frequencies occupying a tiny fraction (i.e., ~1%) of available bandwidth. As commercial spectral usage increases into the next century, communication systems will inevitably face constricting limits on information capacity. Without a means and method for signal coexistence, communication systems will be forced to move to ever higher bands of operation. In a cluttered environment, anywhere from 100 MHz to 2 GHz of bandwidth will be needed to ensure high multimedia throughput and multi-access performance. What is needed are new technologies that overcome the bandwidth limitation problem by adaptively increasing data throughput without adding bandwidth. The system of the present invention solves the bandwidth/throughput problem via adaptive spectrum exploitation (ASE). ASE will enable automatic time sharing of intermittently used or unused spectral regions. Methods used by ASE are well within the capabilities of software programmable radios.

Figure 7:
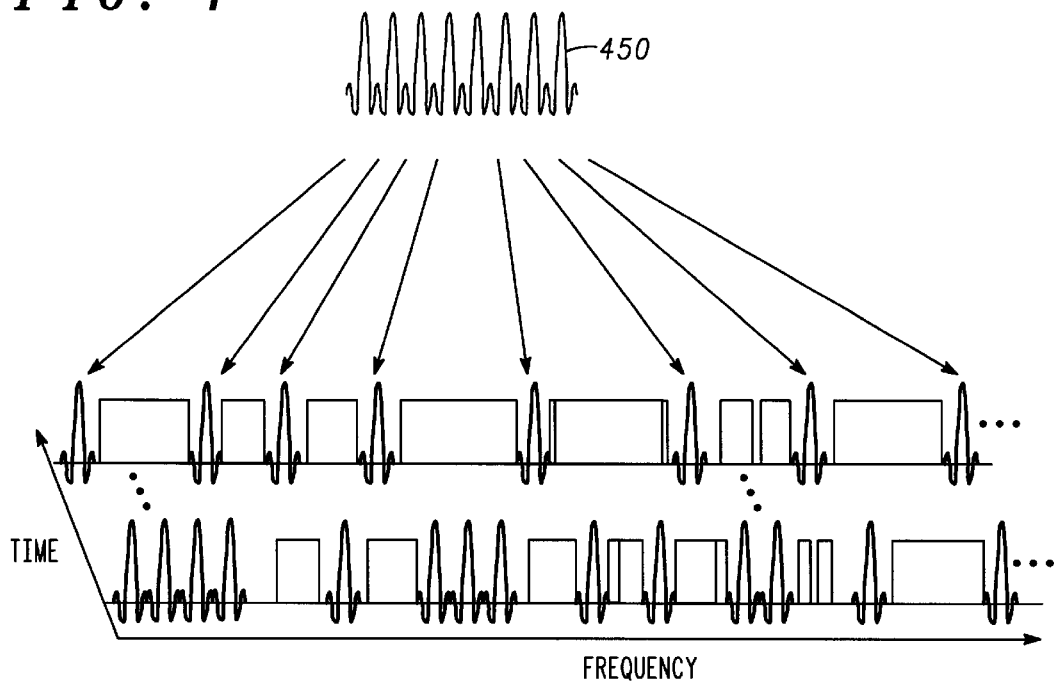
FIG. 7 is a joint time-frequency diagram illustrating dynamic allocation of unused and/or underused spectrum.
Figure 8:
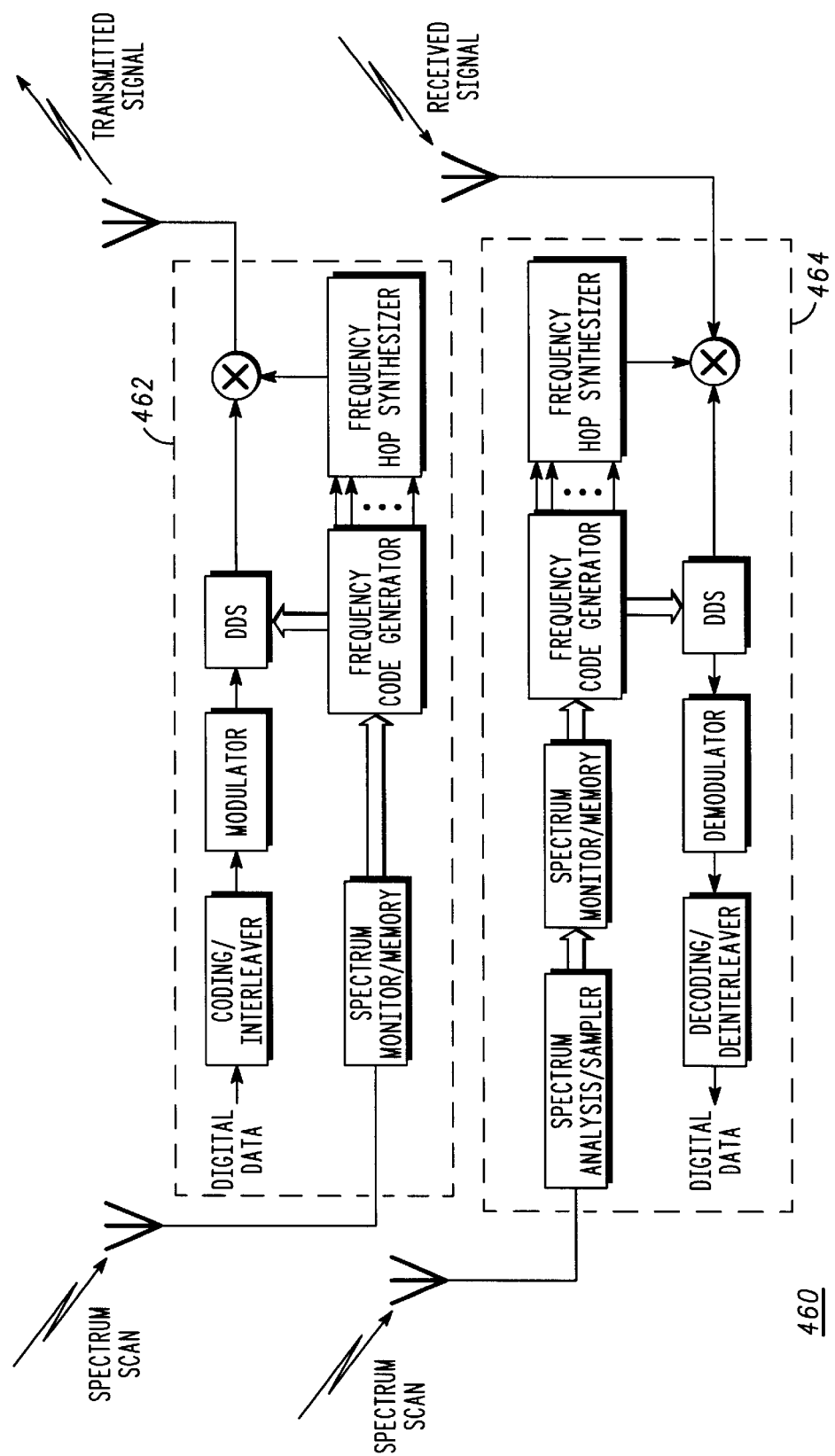
FIG. 8 is a block diagram illustrating a system having a spectrum scanning mode in accordance with one embodiment of the present invention.

In a preferred embodiment, adaptive spectrum exploitation is performed using transform domain methods on a joint time frequency (JTF) basis. FIG. 7 illustrates the JTF signal plane, whereby a data signal 450 is dynamically allocated to unused or under-used portions of the spectrum. In one embodiment, the spectrum scanning is performed by a single programmable WITS WAU, which controls a distributed network of data utilization devices 205 within a given cell. In this manner, the controlling WITS WAU within the cell is assigned the task of spectrum scanning, analysis, and coordination. FIG. 8 illustrates a conceptual block diagram of this function within a system 460 having a WITS WAU 462 and a utilization device 464. In this embodiment, the system 460 uses a frequency hopping spectral adaptation approach. Note that for this mode of operation, the WITS WAU 462 scans the available spectrum to find the under-used portions of the spectrum. Adaptation is performed in two distinct modes of operation for sparse vs. non-sparse spectra. Methods include radiometric analysis, signal parameter extraction, traffic pattern analysis, and channel activity prediction. In this dynamic environment, issues of rate adaptation, modulation adaptation (i.e., M-ary constellation order), and total bandwidth adaptation are considered. Although FIG. 7 and FIG. 8 illustrate a pure frequency hop approach, hybrid methods which conceal the hop impulse (e.g., FH/DSPN hybrid) may also be considered for applications requiring further signal concealment protection.

Surveillance and monitoring is gained via analysis of the spectrum using feature plane transformations, such as amplitude projections, phase projections, time projections, detection information, and signal correlation data. These transformations are analyzed to provide information specific to each discrete signal within the analysis bandwidth, such as type, frequency range, transmit probabilities, and signal strength. The feature plane transformations are computed from the JTF matrix H of order n,m, where n represents a contiguous time index and m represents a contiguous spectral index, as is indicated by Equation 1.

$$H = \begin{bmatrix} h(0,0) & h(1,0) & h(2,0)\ldots & h(m-10) \\ h(0,1) & & & \\ h(0,2) & \cdots & \cdots & \cdots \\ \vdots & \vdots & \vdots & \vdots \\ h(0,n-1) & \cdots & \cdots & h(m-1,n-1) \end{bmatrix} \quad \text{Eq. 1}$$

Parameter extraction algorithms well within the capabilities of programmable radios are used to compute a snapshot of spectral activity corresponding to H. The following structure comprises a candidate parameter set for one embodiment of the invention:

| | |
|---|---|
| fm_dev | % Instantaneous frequency bandwidth |
| fm_modes | Discrete frequency steps |
| fm_center | Center frequency |
| am_dev | % Amplitude Excursion |
| am_modes | Discrete amplitude steps |
| am_center | Mean amplitude |
| pm_dev | % Discriminator width |
| pm_modes | Discrete phase modes |
| pm_center | Mean discriminant value |
| pk_ave | Peak signal envelope to mean value |
| pk_rms | Peak signal envelope to rms value |
| bd_rate | Signal baud rate |
| dt_cycle | Duty cycle |
| cr_line | Chip rate line. |

In addition to the adaptive exploitation of spectral "holes", it may also be desirable to employ the spectrum scanning and analysis in a tagging mode. In this manner, signals within the band of interest may be identified and tagged such as military, cellular, satcom, broadcast, global positioning system (GPS), and pager. Data of interest may also include TDOA estimates and network identification tags. This emitter analysis mode will provide network managers with expanded spectral awareness for each cell in the network. This information is communicated via the satellite/platform or wireline links shown in FIG. 2.

At sufficiently high frequencies with wide bandwidths of operation, the spectral planning may allow the WITS WAU in the cell to access the spectrum in a uniform distribution. In this straightforward mode, the MAI characteristics will depend primarily on the number of users accessing the selected bandwidth. Naturally, higher frequency propagation loss characteristics will result in smaller cells with fewer users per cell, while increased bandwidths will enhance system robustness to interference. In this mode of operation, the transmission characteristics will include both frequency hopping and pulse concealment methods in order to avoid interference with fixed communication systems.

WITS WAU 201 solves the difficult problem of interpreting one protocol down to a critical OSI layer and inserting another protocol layer for the new transmission format without affecting the message information content. WITS WAU 201 combines the signal processing and signal protocols associated with STS 303, WDP 309, and the SPT processor 307 with a common bus and hardware/software platform to reduce delay, maintain the high data rates and multiple access capability, and choose the proper cost method.

WITS WAU 201 collects and maps the user profile information for best "information contouring." This feature filters information to reduce the amount of bandwidth or transmission time allocated to a wireless user. This also reduces the information load on the user.

What is claimed is:

1. A communication system comprising:
   a plurality of data utilization devices distributed within a first data service area, each of said data utilization devices being coupled to a device transceiver for providing wireless communication with an exterior environment; and
   a wireless access unit (WAU), located within said first service area, including:
      a wireless communication transceiver subsystem having a wireless transceiver coupled to an antenna for communicating with an external communications platform via a first wireless channel, wherein said external communications platform is capable of providing a plurality of communications services with a data rates of at least 400 kbps to said WAU; and
      a WAU transceiver subsystem for communicating directly, via a separate single wireless bi-directional channel, with a selected data utilization device in said plurality of data utilization devices;
   wherein said WAU transceiver subsystem is coupled to said wireless communication transceiver subsystem for enabling communication between said WAU transceiver subsystem and said wireless communication transceiver subsystem.

2. The communications system, as claimed in claim 1, wherein said communications platform is mobile.

3. The communications system, as claimed in claim 1, wherein said communications platform is located on an aircraft.

4. The communications system, as claimed in claim 1, wherein said communications platform is mounted to a structure within said first service area.

5. The communications system, as claimed in claim 1, wherein said communications platform includes a cellular telephone system.

6. The communications system, as claimed in claim 1, wherein communication from said external platform through said WAU and to said selected data utilization device is low delay.

7. The communications system, as claimed in claim 6, wherein communication between said external platform, said WAU and said plurality of data utilization devices is full duplex.

8. The communications system, as claimed in claim 1, wherein said WAU comprises a software programmable radio.

9. The communications system, as claimed in claim 1, wherein said WAU transceiver subsystem includes means for performing spread spectrum communications.

10. The communications system, as claimed in claim 9, wherein said means for performing spread spectrum communications includes means for performing hybrid spread spectrum modulation.

11. The communications system, as claimed in claim 10, wherein said means for performing hybrid spread spectrum modulation includes means for performing both frequency hopping and direct sequence spread spectrum modulation on a signal.

12. The communications system, as claimed in claim 11, wherein said means for performing hybrid spread spectrum modulation includes means for adjusting frequency hopping processing gain.

13. The communications system, as claimed in claim 11, wherein said means for performing hybrid spread spectrum modulation includes means for adjusting direct sequence spread spectrum processing gain.

14. The communications system, as claimed in claim 11, wherein said means for performing hybrid spread spectrum modulation includes means for adjusting both frequency hopping processing gain and direct sequence spread spectrum processing gain.

15. The communications system, as claimed in claim 1, further comprising a processor, coupled to said WAU transceiver subsystem, for use in identifying unused radio frequency spectrum in said second wireless channel and for selecting at least one operational frequency for said WAU transceiver subsystem in accordance therewith.

16. The communications system, as claimed in claim 1, wherein said WAU includes an internet protocol gateway.

17. The communications system, as claimed in claim 1, wherein said plurality of data utilization devices includes at least one peer-to-peer link between data utilization devices.

18. The communications system, as claimed in claim 1, wherein said WAU includes a peer-to-peer antenna for use in communicating with at least one other WAU.

19. The communications system, as claimed in claim 1, wherein said WAU includes an encryption processor for use in encrypting/decrypting communications signals transferred between said WAU and said selected data utilization device.

20. The communications system, as claimed in claim 1, wherein said WAU includes a spectrum scanning processor for use in monitoring a spectral environment in said second wireless channel.

21. The communications system, as claimed in claim 20, wherein said WAU includes means for generating a transmit signal based on said spectral environment in said second wireless channel.

22. The communications system, as claimed in claim 1, wherein said WAU includes means for suppressing interference components in signals received from said second wireless channel.

23. The communications system, as claimed in claim 1, wherein said communications system operates as an overlay on at least one other communications system having an overlapping operational frequency range.

* * * * *